United States Patent [19]

Espevik

[11] Patent Number: 4,667,062
[45] Date of Patent: May 19, 1987

[54] SWIVEL FITTING FOR ELECTRICAL CONDUIT AND THE LIKE

[75] Inventor: Craig S. Espevik, Chicago, Ill.

[73] Assignee: Cooper Industries, Houston, Tex.

[21] Appl. No.: 772,288

[22] Filed: Sep. 4, 1985

[51] Int. Cl.$^4$ ............................................. H02G 3/06
[52] U.S. Cl. .................................. 174/65 R; 174/81; 285/11; 403/164
[58] Field of Search ................... 174/65 R, 65 SS, 81, 174/86, 78; 285/11, 158, 161; 403/78, 164, 165

[56] References Cited

U.S. PATENT DOCUMENTS

| | | | |
|---|---|---|---|
| 2,052,394 | 8/1936 | Fullman | 285/158 |
| 2,821,567 | 1/1958 | Bergan | 174/65 SS X |
| 3,239,252 | 3/1966 | Schmitt et al. | 285/250 |
| 3,365,216 | 1/1968 | Babylon | 285/158 |
| 3,893,719 | 7/1975 | Eidelberg et al. | 285/55 |
| 4,026,581 | 5/1977 | Pasbrig | 285/24 |
| 4,042,262 | 8/1977 | Mooney et al. | 285/98 |
| 4,060,264 | 11/1977 | Gajajiva | 285/175 |

FOREIGN PATENT DOCUMENTS 749232 11/1944 Fed. Rep. of Germany ... 174/65 SS

Primary Examiner—Arthur T. Grimley
Assistant Examiner—D. A. Tone
Attorney, Agent, or Firm—E. E. Scott; R. L. Maxwell

[57] ABSTRACT

A swivel fitting for electrical conduit and the like comprising a first fitting part having an axially extending tubular section and a second fitting part having a generally cylindrical axially extending section disposed in sleeved relationship within the tubular section of the first fitting part and having a distal end surface engageable with a transverse shoulder formed within the interior of the tubular section of the first fitting part. The second fitting part has a head portion with a generally annular channel for receiving the distal end of the tubular section of the first fitting part. The channel is delimited by a transverse surface which is axially spaced from the transverse end face of the cylindrical section so that in any position of the fitting, rainwater and other liquid spray will be prevented from intrusion into the interior wireway formed by the fitting. A circumferential groove formed on the tubular section minimizes the intrusion of liquid into the channel and facilitates drainage therefrom. The fitting parts are held in assembled relationship by a circumferential groove in the cylindrical section and cooperating radially inwardly extending projections which are formed in the tubular section of the first fitting part.

9 Claims, 5 Drawing Figures

SWIVEL FITTING FOR ELECTRICAL CONDUIT AND THE LIKE

BACKGROUND OF THE INVENTION

1. Field of the Invention

The present invention pertains to a rainproof, swivel fitting for electrical conduit.

2. Background

Various efforts have been made to develop swivel type fittings such as couplings or connectors for electrical conduit and similar structures. Several problems have been associated with previous efforts to develop swivel type fittings which are substantially rainproof and which also are operable to allow free swiveling movement of one conduit section relative to another conduit section or relative to an enclosure.

In many applications of electrical conduit for housing electrical conductors and the like, there is a growing need to provide a conduit connection between a machine or component which is moving relative to another and wherein free swiveling movement should be provided at some point in the conduit system. Such applications also typically do not require that the connection be completely resistant to admission of water or other fluids into the interior or wireway of the conduit if submersed, for example, but it is necessary that the connection be essentially rainproof or resistant to the admission of water into the wireway as a result of liquid spray in the vicinity of the fitting.

Prior art types of swivel couplings or connectors for electrical conduits and the like are typified by two or more components and a resilient gasket and wherein one component is threadedly connected to another. Upon tightening of one component relative to the other to engage the resilient sealing element, a binding action occurs which does not permit a swiveling movement and in fact eliminates any relative motion.

Accordingly, it has been considered highly desirable to provide a swivel type fitting or coupling for electrical conductor conduits which is mechanically uncomplicated, is capable of providing a continuous electrical ground path through the fitting structure, is essentially rainproof in all operating positions and provides free swiveling movement of one fitting member relative to another without the chance of disconnection or unthreading of the coupled parts due to swiveling movement or vibration. It is to this end that the present invention has been developed.

SUMMARY OF THE INVENTION

The present invention provides an improved swivel fitting, particularly adapted for use with electrical conduit in applications where relative movement of a machine element or conduit section is required relative to another conduit section or enclosure.

In accordance with the one aspect of the present invention, a swivel fitting is provided which includes a body member having a generally cylindrical tubular section which extends into an annular channel formed in a second fitting part comprising a nut wherein the nut and the body are retained in assembly for free swiveling movement of one part relative to the other while providing a continuous electrically conductive ground path and while also providing a rainproof connection to substantially prevent entry of rain water or other liquids into the interior area or wireway of the fitting.

In accordance with another aspect of the present invention, there is provided a free swiveling fitting for electrical conduit and the like wherein entry of rain water and other liquids into the wireway of the conduit is prevented without requiring a resilient sealing element between the fitting parts. The fitting is also constructed such that the swiveling movement of the fitting is not dependent on the degree of tightness between two threaded members and threaded connections may be made between each of the fitting parts and a conduit section or other structure without effecting the ability of the fitting to provide free movement of one fitting part relative to the other.

In accordance with yet a further aspect of the present invention, a rainproof swivel fitting is provided which includes a generally cylindrical tubular portion of one part extending into an annular channel formed in another part and wherein a generally annular channel shaped clearance space is provided between the two parts. Incursion of rain water and other free falling liquids or sprays into the clearance space is also minimized by the provision of a circumferential groove formed on the cylindrical tubular portion of the one part, which groove extends at least partially into the annular channel formed on the other fitting part to minimize the flow of rain water and other fluid into the clearance space formed within the channel.

The swivel fitting of the present invention still further advantageously includes two cooperable parts which are easily fabricated and may be easily permanently assembled one part to the other. In a preferred embodiment of the invention, the fitting nut or part provided with the annular channel includes a generally cylindrical section which extends into the cylindrical tubular portion of the other part or body and is provided with a circumferential groove. The body is assembled in telescoping or overlapping relationship to the nut and is retained thereon by the formation of preferably two or more radially inwardly extending projections which may be formed by a punching operation, for example, to permanently assemble one part to the other while retaining the free swiveling characteristics of the two parts.

The above described features and advantages of the present invention as well as other superior aspects thereof will be further appreciated by those skilled in the art upon reading the detailed description which follows in conjunction with the drawing.

DESCRIPTION OF THE PREFERRED EMBODIMENT

Figure 1:
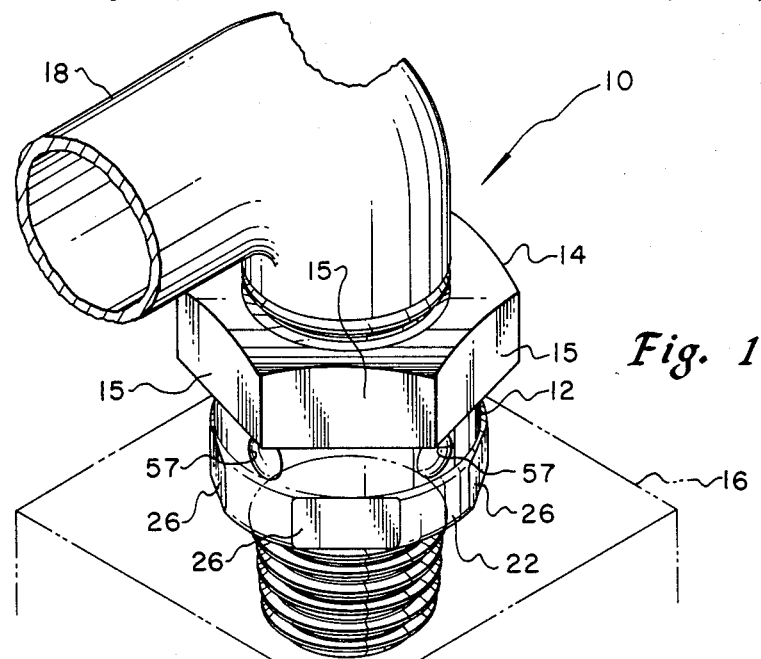
FIG. 1 is a perspective view of a swivel fitting in accordance with the present invention.

In the description which follows like parts are marked throughout the specification and drawing with the same reference numerals, respectively. The drawing figures are not necessarily to scale and certain features of the invention may be shown exaggerated in scale in the interest of clarity.

Referring to FIG. 1, a rainproof swivel fitting in accordance with the present invention is illustrated and generally designated by the numeral 10. The fitting 10 includes a first part or body 12 and a second part or nut 14. The fitting 10 is advantageously utilized in applications wherein an electrical conduit is required to be connected to an enclosure or a machine part 16, for example, whereby electrical conductors extend through a conduit section 18 into a suitable guideway or wireway, not shown, formed within the machine element 16 or another section of conduit, for example.

Figure 2:
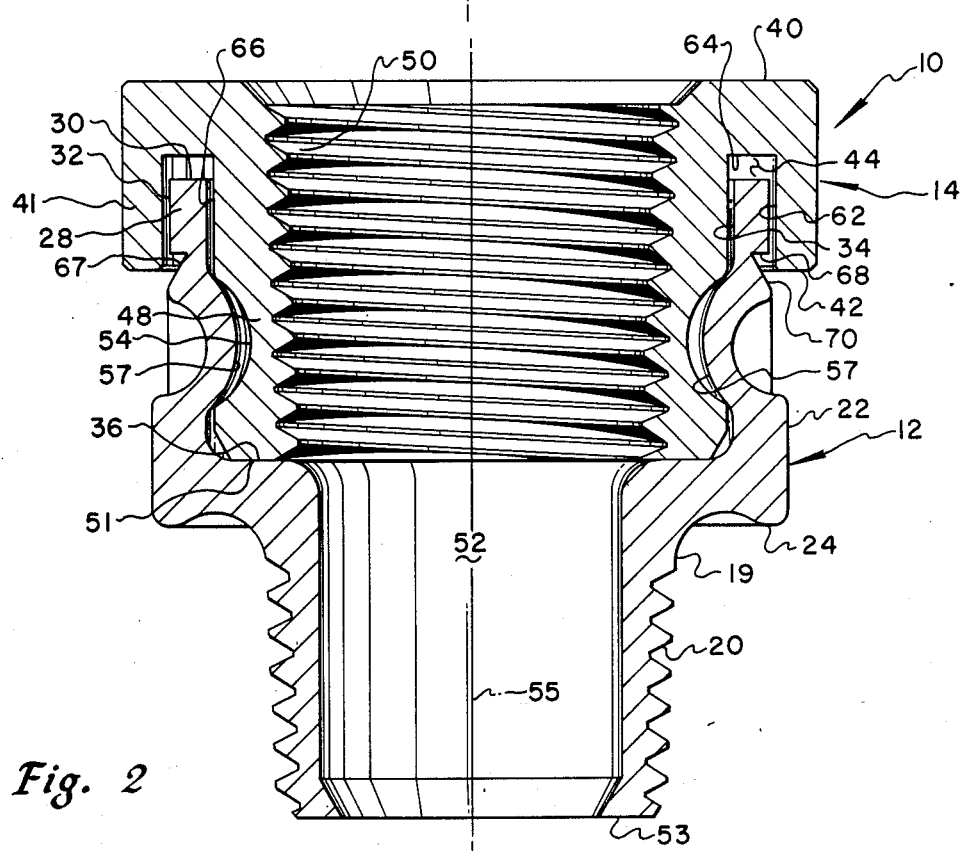
FIG. 2 is a central longitudinal section view of the swivel fitting illustrated in FIG. 1.

Referring to both FIGS. 1 and 2, the body 12 includes a generally cylindrical conduit portion 19 which may be provided with external threads 20 for threadedly connecting the body with the machine element 16 or virtually any component which forms a continuation of the aforementioned conductor wireway or conduit passage. Alternatively, the body 12 could be provided with internal threads for connection to an externally threaded element, for example. The body 12 also includes an enlarged diameter portion 22 forming an external transverse shoulder 24. A plurality of wrench flats 26, FIG. 1, are preferably provided on the portion 22 for use in connecting and disconnecting the body 12 with respect to the machine element 16 or other conduit section, not shown. Referring further to FIG. 2, the body 12 also includes a generally cylindrical axially extending tubular portion 28 having a transverse distal end surface 30, an outer circumferential surface 32 and an inner circumferential surface 34. The difference in diameters of the surface 34 and the body portion 18 provides an interior transverse shoulder 36.

The fitting part or nut 14 is preferably formed to have an outer generally hexagonal configuration with opposed wrench flats 15, FIG. 1, although the part 14 may take other configurations as regards the external shape thereof. In any case, the fitting part 14 is provided with a transverse end face 40 and an opposed transverse shoulder 42 in which is formed a generally annular channel 44 which receives the distal end 30 of the tubular portion 28 of the body part 12. The fitting part 14 also includes a generally cylindrical axially projecting section 48 which projects into the body part 12 in overlapping relationship with the tubular part 28. The fitting part 14 is also typically provided with internal threads 50 for connection of the fitting part 14 with a conduit section such as the conduit section 18. Accordingly, the fitting parts 12 and 14 are adapted to form a continuous internal passage or wire way 52 extending between the transverse face 40 and an end face 53 of the body part 12. The fitting part 14 is also provided with a circumferential groove or recess 54 which preferably has a generally arcuate cross-sectional shape.

The fitting parts 12 and 14 are retained in assembly with each other while providing for free swiveling or rotational movement of one part relative to the other about an axis 55 by the provision of at least two or more generally radially inwardly extending projections or dimples 57 which extend into the groove 54. The parts 12 and 14 are typically made of suitable engineering metals and the projections 57 are preferably formed by plastic displacement of portions of the tubular section 28 at circumferentially spaced positions such as indicated in FIGS. 1 and 2. The respective parts 12 and 14 are preferably dimensioned such that upon formation of the projections 57, a transverse end surface 51 on the fitting part 14 is normally in engagement with the shoulder 36 and contact is also made between portions of the projections 57 and the arcuate surface defining the groove 54 so that in any position of the parts 12 and 14 relative to each other a continuous electrical ground path is provided between the parts while permitting free rotation of one part relative to the other. The channel 44 and the tubular portion 28 of the body part 12 are preferably dimensioned such that a generally U-shaped clearance space is formed between the surfaces 30, 32 and 34 of the body part 12 and surfaces 62, 64 and 66 defining the channel 44.

In accordance with an important aspect of the present invention, the tubular section 28 of the body part is provided with a circumferential groove 67 defined by a transverse surface 68 extending in a plane generally normal to the axis 55 and a somewhat conical surface 70 intersecting the surface 68 and the exterior surface 32 of the tubular section 28. The groove 67 defined by the surfaces 68 and 70 extends into the channel 44. In other words, the surface 68 is always displaced an axial distance from the surface 42 within the channel 44. Moreover, the surface 70 preferably does not intersect the surface 32 within the channel 44 but, in effect, the groove formed by the surfaces 68 and 70 overlaps or bridges the entrance to the channel 44 which is delimited by the surface 42. The provision of the groove 67 is particularly advantageous in applications of the fitting 10 in generally horizontal positions of the axis 55 or near horizontal positions thereof in the way of preventing the flow of water into the interior wireway 52.

The fitting 10 may be manufactured using generally conventional manufacturing processes for forming the body part 12 and the fitting part or nut 14. The wall thickness of the tubular section 28 is sufficient to provide for plastic displacement to form the projections 57 by a conventional punching operation. The amount of radial inward displacement of material to form the projections 57 is suitably controlled so that the projections extend into the groove 54 to prevent axial separation of the parts 12 and 14 and to also retain the surface 51 substantially engaged with the shoulder 36 to provide a continuous electrical ground path between the parts 12 and 14 while at the same time engagement of the projections 57 with the surface of the groove 54 near its intersection with the exterior surface of the axial portion 48 of the fitting part 14.

When the fitting 10 is used in an application wherein the axis 55 is extending vertically as shown in FIG. 2, or at some angle between vertical and horizontal and the fitting part 14 is generally above the body part 12, rainwater or other liquids falling generally vertically or even at substantially any other angle will not enter the wireway 52 since the exterior annular rim 41 defining part of the channel 44 overlies the tubular section 28. In generally horizontal or other positions of the fitting 10, the groove 67 also, surprisingly, tends to break up any flow of water due to intense rainfall or spray tending to enter the channel 44 while preventing the flow of water through the generally U-shaped clearance space and into the area between the exterior of the axial portion 48 and the tubular part 28 to further preclude the possibility of water or other liquid entry into the wireway 52.

Figure 3:
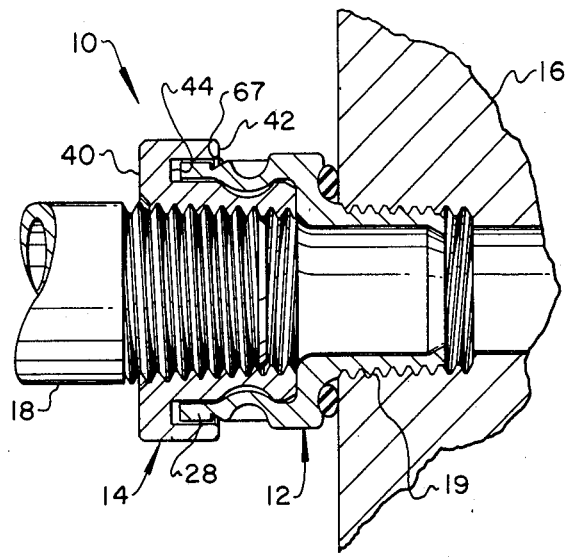
FIGS. 3 through 5 show representative positions of the swivel fitting, all of which are rainproof.
Figure 4:
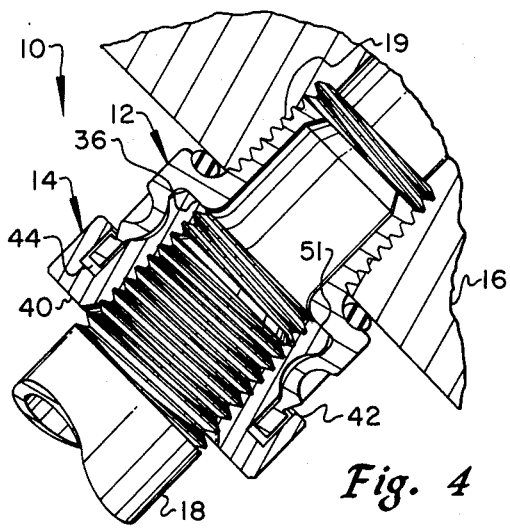
Figure 5:
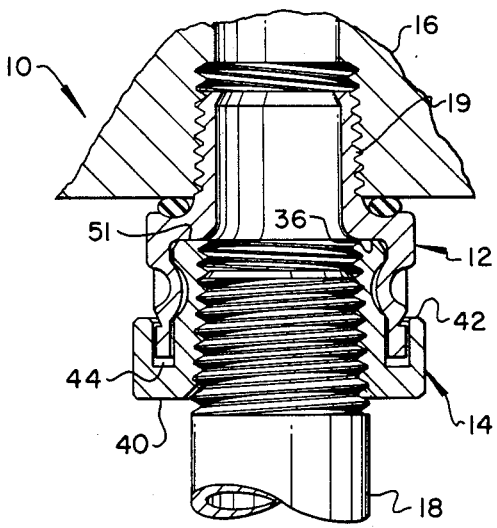

FIG. 3 illustrates the horizontal position of the fitting 10 wherein the likelihood of incursion of water into the wire way 52 is perhaps the greatest. However, the provision of the groove 67 bridging the entrance to the channel 44 with the exterior of the fitting has provided surprising results as regards the minimization of the incursion of water into the U-shaped space formed between the surfaces defining the channel 44 and the distal end of the tubular portion 28. In any position of the fitting 10 between the position illustrated in FIG. 3 and the positions illustrated in FIGS. 4 and 5, the lowermost edge of the channel 44 which is delimited by the surface 42 is always below the lowermost point of engagement of the surface 51 with the shoulder 36 so that if the channel 44 fills with liquid, it will run out of the channel before a level is reached which would provide entry into the wireway 52.

The use of the fitting 10 is believed to be readily apparent to those skilled in the art upon reading the foregoing description. The assembly procedure for the fitting 10 previously described assures that there is normally an electrically conductive ground path between the parts 12 and 14. The parts 12 and 14 are normally dimensioned such that on assembly of one part to the other, the surface 51 is brought into engagement with the shoulder 36 and held in that position while the controlled displacement of the tubular section 28 is carried out to form the projections 57 to retain the surface 51 in engagement with the shoulder 36 without causing a binding or seizing action between surfaces when one fitting part is rotated relative to the other.

Those skilled in the art will recognize that the fitting parts 12, and 14 may also be modified to be used in conjunction with other fitting configurations such as, for example, the fitting described in U.S. Pat. No. 3,239,252 which is assigned to the assignee of the present invention.

Although one embodiment of the invention has been described herein in detail, those skilled in the art will recognize that the specific configuration of the fitting described herein may be modified without departing from the scope and spirit of the present invention recited in the appended claims.

What I claim is:

1. A rainproof swivel fitting for electrical conduit and the like comprising:
   a first fitting part including a generally cylindrical tubular section extending axially with respect to a central longitudinal axis of said first fitting part;
   a second fitting part having a head portion and a generally cylindrical section extending axially from said head portion and in sleeved relationship within said tubular section of said first fitting part, said cylindrical section including a surface engageable with a cooperating surface on said first fitting part to form a continuous electrically conductive ground path through said fitting, said second fitting part including a generally annular channel for receiving a distal end of said tubular section of said first fitting part whereby the entry of rain water into an interior wireaway formed by said first and second fitting parts is precluded in substantially all positions of said fitting; and
   cooperable means on said first fitting part and said second fitting part for retaining said fitting parts in assembled relationship to each other while permitting rotation of one fitting part relative to the other fitting part about said axis, said cooperable means including a generally circumferential groove formed in said cylindrical section of said second fittting part and radially inwardly extending porjection means on said tubular section of said first fitting part extending into said groove to prevent axial separation of said fitting parts.

2. The fitting set forth in claim 1, wherein:
said projection means comprise circumferentially spaced plastically deformed portions of said tubular section extending into said groove.

3. The fitting set forth in claim 2, wherein:
said surfaces on said fitting parts include a transverse shoulder formed on a body portion of said first fitting part engageable with a transverse end face of said cylindrical section of said second fitting part, and said projection means are formed to extend into said groove sufficiently to hold said surfaces in substantially electrically conductive engagement with each other.

4. A rainproof swivel fitting for electrical conduit and the like comprising:
   a first fitting part including a generally cylindrical tubular section extending axially with respect to a central longitudinal axis of said first fitting part, said tubular section including a circumferencial groove formed on an outer surface thereof, said groove being formed by a first surface extending generally in a plane normal to said axis and a second surface intersecting said first surface and an outer circumferencial surface of said tubular section;
   a second fitting part having a head portion and a generally cylindrical section extending axially from said head portion and in sleeved relationship within said tubular section of said first fitting part, said cylindrical section including a surface engageable with a cooperating surface on said first fitting part to form a continuous electrically conductive ground path through said fitting, said second fitting part including a generally annular channel for receiving a distal end of said tubular section of said first fitting part whereby the entry of rainwater into an interior wireway formed by said first and second fitting parts is precluded in substantially all positions of said fitting, said circumferential groove formed on an outer surface of said tubular section extending at least partially into said generally annular channel to minimize the flow of water into said channel between opposed surfaces on said tubular section and a portion of said second fitting part forming said channel; and
   cooperable means on said first fitting part and said second fitting part for retaining said fitting parts in assembled relationship to each other while permitting rotation of one fitting part relative to the other fitting part about said axis.

5. The fitting set forth in claim 4, wherein:
said groove extends axially along said tubular section from a point out of said channel to a point within said channel.

6. A rainproof swivel fitting for electrical conduit and the like comprising:
   a first fitting part including a body portion and a generally cylindrical tubular section extending axially from said body portion with respect to a central longitudinal axis of said first fitting part, said tubular section having a distal end defined by a generally transverse surface;
   a second fitting part having a head portion and a generally cylindrical section extending axially from said head portion and in sleeved relationship within said tubular section of said first fitting part, said cylindrical section being delimited by a generally transverse end face, an annular channel formed in said second fitting part for receiving the distal end of said tubular section in interfitting relationship thereto, said channel being delimited by a transverse surface axially spaced from said transverse end face of said cylindrical section whereby the accumulation of water or other liquid in said channel will overflow said channel and drain away from said fitting before entering an interior wireway of said fitting.

7. A rainproof swivel fitting for electrical conduit and the like including at least two cooperating coupling parts, one of said fitting parts being rotatable relative to the other of said fitting parts and forming a rainproof wireway within said fitting parts free from the intrusion of rainwater or other liquids into said wireway, said fitting parts being characterized by one of said fitting parts having a body portion and an axially extending tubular section integral with said body portion and delimited by a distal end surface, the other of said fitting parts being provided with an annular channel for receiving said distal end surface of said tubular section and a cylindrical section extending in sleeved relationship within said tubular section and having a distal end portion engageable with a transverse surface formed on said first fitting part, a generally circumferential groove formed on said cylindrical section of said second fitting part, and radially inwardly displaced portions of said tubular section extending into said groove for securing said fitting parts in assembly with each other while permitting relatively free rotation of one fitting part relative to the other and establishing an electrically conductive ground path between said fitting parts.

8. The fitting set forth in claim 7, wherein:
said radially displaced portions of said tubular section are disposed between said body portion and a surface on said head portion delimiting said channel.

9. The fitting set forth in claim 7, wherein:
said tubular section includes a generally circumferential groove formed on the exterior thereof and extending at least partially within said channel.

* * * * *